United States Patent [19]
Labes

[11] Patent Number: 5,143,709
[45] Date of Patent: Sep. 1, 1992

[54] PROCESS FOR PRODUCTION OF GRAPHITE FLAKES AND FILMS VIA LOW TEMPERATURE PYROLYSIS

[75] Inventor: Mortimer M. Labes, Philadelphia, Pa.

[73] Assignee: Temple University, Philadelphia, Pa.

[21] Appl. No.: 639,732

[22] Filed: Jan. 10, 1991

Related U.S. Application Data

[63] Continuation-in-part of Ser. No. 365,801, Jun. 14, 1989, abandoned.

[51] Int. Cl.$^5$ .............................................. C01B 31/02
[52] U.S. Cl. ................................. 423/449; 423/450; 423/453; 423/445
[58] Field of Search ............... 423/445, 448, 449, 450, 423/453; 252/502

[56] References Cited

U.S. PATENT DOCUMENTS

| | | | |
|---|---|---|---|
| 3,140,192 | 7/1964 | Jordan et al. | 423/450 |
| 3,377,137 | 4/1968 | Latham | 423/450 |
| 3,664,813 | 5/1972 | Hollander | 423/448 |
| 4,014,980 | 3/1977 | Fujimaki et al. | 423/448 |
| 4,572,813 | 2/1986 | Arakawa | 423/448 |
| 4,701,317 | 10/1987 | Arakama | 423/458 |
| 4,873,115 | 10/1989 | Matsumura et al. | 427/39 |
| 4,891,203 | 1/1990 | Singer et al. | 423/448 |

FOREIGN PATENT DOCUMENTS

| | | | |
|---|---|---|---|
| 58-110493 | 7/1983 | Japan | 423/448 |
| 968215 | 9/1964 | United Kingdom | 423/448 |

OTHER PUBLICATIONS

Inagaki et al., "Formation of Flaky Graphite Single Crystals by Chemical Transport", Carbon, vol. 9, No. 1, (Jan. 1971), pp. 94 to 96.

*Primary Examiner*—Robert Kunemund
*Attorney, Agent, or Firm*—Ratner & Prestia

[57] ABSTRACT

Electrically conductive carbon flakes and films are prepared in high yield by the pyrolysis of cyclic aromatic hydrocarbons, optionally halogenated, in the presence of a dehydrogenating agent at about at least 800° C. Flakes of thicknesses up to 20 µm and lengths up to 1 cm on a side are metal-like in appearance and have a conductivity of about 200-300 S/cm at room temperature. By heat treatment to 2600° C., graphitic order is improved and the conductivity rises to ≈10000-15000 S/cm.

13 Claims, 3 Drawing Sheets

PROCESS FOR PRODUCTION OF GRAPHITE FLAKES AND FILMS VIA LOW TEMPERATURE PYROLYSIS

This invention was made during work performed under National Science Foundation Grant No. DMR 87-03526 and the Government has certain rights therein.

This application is a continuation of application Ser. No. 07/365,801 filed June 14, 1989, now abandoned.

FIELD OF THE INVENTION

This invention pertains to conductive carbon films and flakes made from simple aromatic precursors, and the methods involved therein.

INFORMATION DISCLOSURE STATEMENT

Murakami et al. in Mol. Cryst. Liq. Cryst. Vol. 188, 95-102 (1985) disclose the preparation of a one-dimensional graphite polymer via the vapor phase polymerization of 3,4,9,10-perylenetetracarboxylic dianhydride (PTCDA) at temperatures between 520 and 1200° C. The product is identified as poly-perinaphthalene. The material is reported to be a whisker about 0.2 μm in width and between 1 and 10 mm in length. Conductivities ranged from 0.2 to 1100 S/cm.

Kouvetakis et al. in J. Chem Soc. Chem. Comm. 1758 (1986) disclose the interaction of gaseous pyridine and chlorine within a hot silica tube as producing a silvery deposit when treated at approximately 800° C. This material is said to exhibit superior electrical conductivity versus comparable deposits of carbon. There is no indication that the material was produced in high yields, nor that the material was in the form of flake, film or ribbon.

Endo et al. in Chemical Abstracts 103:23667 (1985) disclose the preparation of sponge-like carbon fibers by the thermodecomposition of benzene at 1100° C. in the presence of iron particles. These carbon fibers have diameters of 0.1 to 1.5 μm and length of 1 mm.

Onuma et al. in Jpn. J. Appl. Phys. Vol. 22, 887 (1983) disclose that the radio frequency plasma decomposition of benzene vapor produces thin carbon films with high conductivity. These films have a conductivity of approximately $10^3$ Siemens/cm when the decomposition was conducted at 1000° C.

U.S. Pat. No. 4,645,713 to Shioya et al. discloses a method for forming conductive graphite films by heating hydrocarbon gas to 700° C. through plasma discharge and subsequent heat treatment at temperatures exceeding 1500° C. Comparative Example 1 reports the preparation of some small fibrous conductive graphitic material but no film or flake from benzene without plasma discharge at a temperature of 1100° C. with an initial conductivity of 600 S/cm, conductivity after heat treatment to 2000° C. of 2000 S/cm.

U.S. Pat. No. 4,701,317 to Arakawa et al. discloses the production of carbon film having an electrical conductivity of about 700 S/cm by the thermodecomposition of diethynylbenzene in an inert carrier gas at a temperature of about 900° C. Films having a thickness of about 0.6 μm were reported to have a conductivity of 3300 S/cm when heat treated at 1000° C.; the conductivity fell to 700 S/cm when heat treated at 2000° C.

U.S. Pat. No. 4,014,980 to Fujimaki et al. discloses the use of condensed polycyclic organic compounds as precursors for manufacturing graphite whiskers by mixing the organic compound with an inert gas heating the material at temperatures of 700°-890° C. for five minutes, followed by heating at 900°-200° C. with subsequent carbonization at 3000° C. in inert gas.

SUMMARY OF THE INVENTION

Simple cyclic aromatic hydrocarbons are efficiently converted to electroconductive films and flakes by pyrolysis in the presence of a dehydrogenating agent at a temperature of at least 800° C. Halogenated forms thereof are converted efficiently even in the absence of added dehydrogenating agent. These films and flakes have a metallic luster, high electrical conductivity, and are chemically inert and thermally stable. The starting materials are simple and inexpensive, and the yields of graphitic material are high.

DETAILED DESCRIPTION OF THE INVENTION

Figure 1:
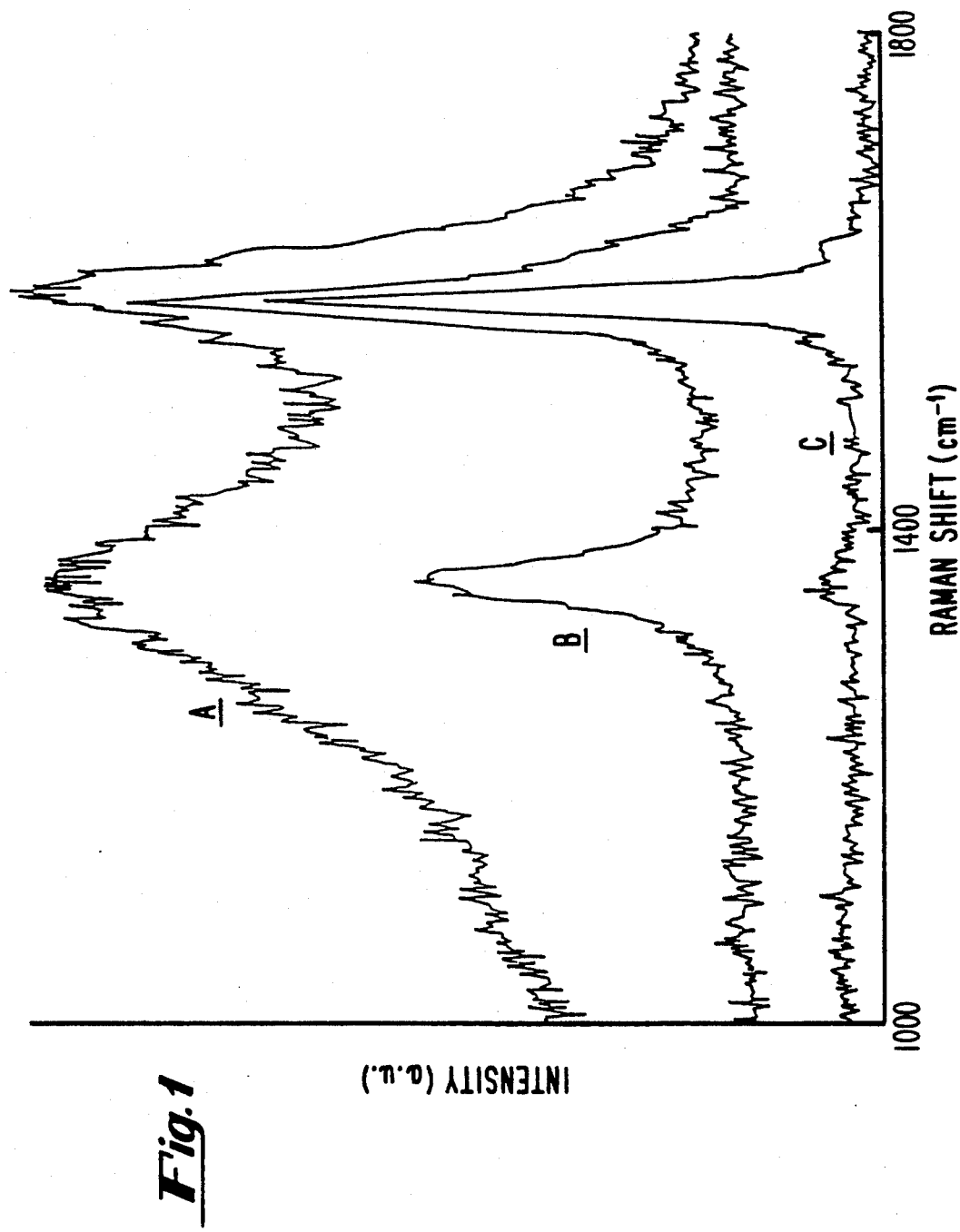
FIG. 1 is a Raman spectra of carbon films prepared from benzene at 850° C. (A) and subsequently heat treated for one hour at 2000° C. (B) and 2600° C. (C).

Conductive carbon flakes and films are prepared by the pyrolysis of cyclic aromatic hydrocarbons in a non-reactive carrier gas in the presence of a dehydrogenating agent at a temperature of at least about 800° C.

As used herein, the term "cyclic aromatic hydrocarbons" refers to unsaturated monocyclic or polycyclic carbon/hydrogen compounds, optionally substituted with halogen atoms or alkyl groups. Generally, halogenated or alkyl substituted benzenes and oligophenylenes are useful. Typical examples of such compounds are benzene, toluene, terphenyl, biphenyl, chlorobenzene, and naphthalene although this list is not exclusive. In addition, it has been found that the nitrogen-containing heterocyclic, pyrazine, is also efficiently converted to graphitic flakes and films under the specific conditions taught herein although other nitrogen-containing heterocyclics give poor yields.

Non-reactive gases suitable for use in this invention include helium, argon, and nitrogen.

The dehydrogenating agent may be any material which is known to one skilled in the art for dehydrogenation reactions, such as chlorine, bromine, sulfur, metals such as platinum, palladium or nickel, or free radical initiators such as diphenyldiazomethane.

Some hydrocarbons and heterocyclics, for example pyridine, give low yields under these conditions. Triazine and cyanuric chloride give only traces of a carbonaceous product.

Reaction temperatures lower than 800° C. result in low yield. In the absence of halogen vapor, a very low yield of carbon-like material is obtained. The yield increases appreciably in the presence of chlorine or bromine vapor. Surprisingly, it has been found that sufficient halogen radical is generated during the pyrolysis of halogenated aromatics to obviate the need for a secondary source of halogen vapor.

The flakes are typically 5 mm to 20 mm on a side, and tend to be somewhat rectangular in shape. In some cases, much larger pieces are formed, the largest being approximately 10 cm long by 1.5 cm wide. Their surfaces are highly reflective and silvery or silveryblack in appearance. The films are not soluble in common organic solvents and concentrated inorganic acids such as HCl, $HNO_3$, and $H_2SO_4$.

No chlorine or bromine is found in these materials, which indicates that the halogens only serve as hydrogen scavengers and/or free radical initiators during the thermal reaction.

Benzene, chlorobenzene, biphenyl, naphthalene, and pyrazine are used as received without purification. The pyrolysis reaction is carried out in a heated quartz tube. Argon or nitrogen is used as the carrier gas and purged through the system prior to each synthesis. The flow rate of carrier gas is 10 to 20 $cm^3$/min. Bromine vapor is injected into the system by bubbling the carrier gas into bromine liquid at a flow rate of 10–20 $cm^3$/min. Alternatively, $Cl_2$ gas (cylinder pressure 85.3 psig) is diluted by the carrier gas at the same flow rate. Hydrocarbon vapor is mixed with the chlorine or bromine vapor before entering the hot zone. The reaction is essentially instantaneous when the vapors enter the hot zone. Shiny mirror-like coatings consisting of film and flake are found on the surface of the tube; some unreacted hydrocarbon is recovered from an exit cold trap. The thickness of the films varies from about 2 $\mu m$ to about 20 $\mu m$ as measured by scanning electron microscopy. Flakes made at 800° to 900° C. are subsequently heated to different heat treatment temperatures (HTT) under He gas for an hour or more in a high temperature furnace.

Raman spectroscopy utilizing the microprobe technique was used to characterize the degree of graphitic order of the pyrolytic films. Conductivity was measured by the standard four-probe technique, attaching four gold or silver wires to the film on a thin insulating substrate with silver paint (Dupont 4922) or conducting adhesive (Amicon CT5047-2). Thermogravimetric analysis (TGA) was used to determine the thermal stability of the films. Elemental analysis was carried out by Huffman and Galbraith Laboratories. X-ray powder diffraction data was obtained on a Rigaku D/Max 2 instrument at the University of Pennsylvania. The weight loss of the pyrolytic films was recorded using a Perkin-Elmer TGS-2 Thermogravimetric Analyzer. Only 4.54% weight loss was observed for pyrolyzed benzene up to 995° C. Pyrolyzed pyrazine had approximately 14% weight loss in the same temperature range. Both these films showed superior thermal stability to poly-peri-naphthalene films.

Figure 2:
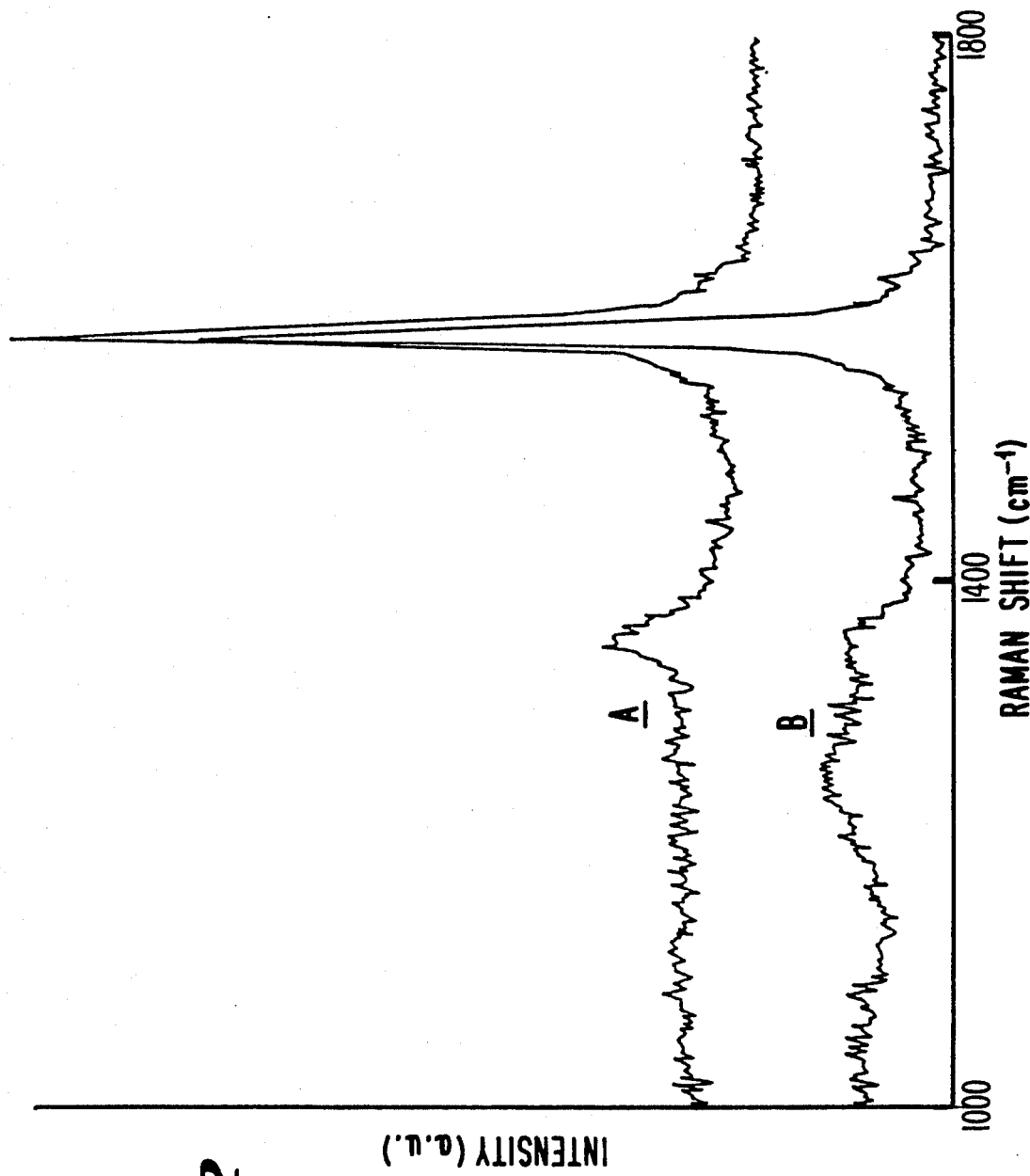
FIG. 2 is a Raman spectra of carbon films derived from pyrazine heat treated at 2600° C. for one hour (A) and at 2300° C. for four hours (B).

FT-IR spectra and FT-IR reflectance spectra show an absence of aromatic peaks in the pyrolyzed films. The Raman scattering spectra reveal two peaks at 1360 $cm^{-1}$ and 1580 $cm^{-1}$ in all the films. The peak at 1580 $cm^{-1}$ was assigned to an ordered graphitic structure and the peak at 1360 $cm^{-1}$ to disordered carbon in accordance with the teachings of Murakami et al. in Synthetic Metals, Vol. 18, 509–514 (1987) and Ohnisi et al. in Synthetic Metals, Vol 18, 497–502 (1987). The intensity of the disorder peak at 1360 $cm^{-1}$ decreases with increasing HTT, while the peak at 1580 $cm^{-1}$ sharpens with increasing HTT. No disorder peak is observed for the pyrolyzed benzene film heated to 2600° C. which suggests that a highly ordered graphitic structure is established at this temperature (FIG. 1). Pyrazine films heated to 2600° C. exhibit a very weak peak at 1360 $cm^{-1}$ However, this disorder peak is completely eliminated by heating at 2300° C. for 4 hours (FIG. 2).

In X-ray powder diffraction, only the (00λ) peaks are seen, indicating that the graphite layer is essentially parallel to the flat surface of the flake. Samples prepared at 850° C. show no graphite diffraction; however, the intensities of the (00λ) reflections increase with HTT.

Figure 3:
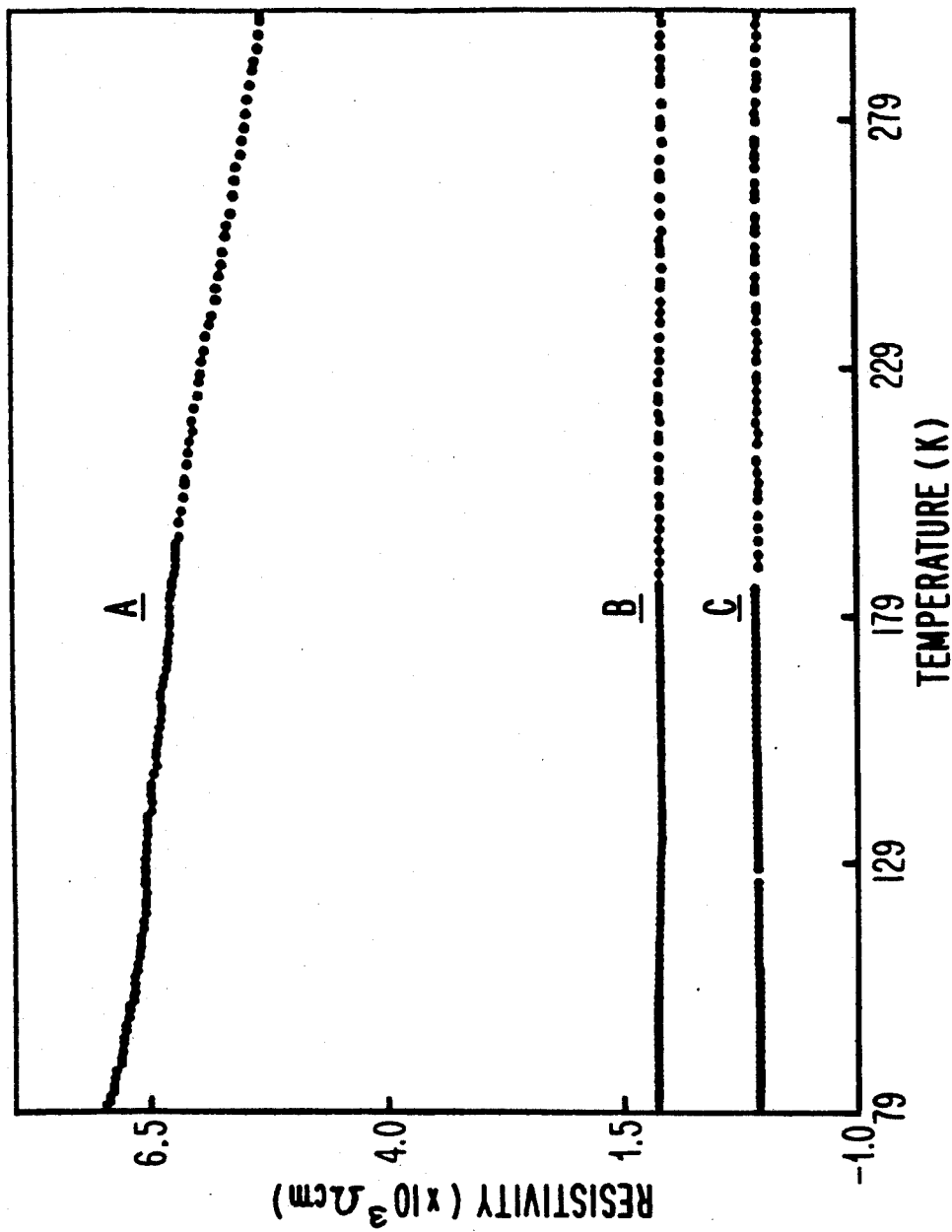
FIG. 3 is a plot of the temperature dependence of the resistivity of carbon films derived from benzene at 850° C. (A) and subsequently heat treated for one hour at 1500° C. (B) and 2600° C. (C).

The typical room temperature conductivity for the films formed at 800°–900° C. is 200–300 S/cm and rises to 15000 S/cm for pyrolyzed benzene after heat treatment at 2600° C. The temperature dependence of the resistivity of the pyrolyzed benzene was studied from 80° K to 300° K. FIG. 3 shows the temperature dependence of resistivity of benzene-derived films. The resistivity of the films formed at 800°–850° C. increases slightly with decreasing temperature while the films prepared at higher HTT show an essentially temperature independent resistivity, indicative of crystalline conductivity.

EXAMPLE 1

Argon gas at a flow rate of $\approx 10$ $cm^3 min^{-1}$ was passed through the top of an attached vessel containing benzene at $\approx 60°$ C. An independent argon stream at the same flow rate was bubbled through an attached vessel containing bromine vapor. These two streams merged prior to entering the hot zone, which was maintained at 850° C. in a Thermodyne or Lindberg tube furnace. The pyrolysis tube was made of quartz and was 38 mm in diameter and approximately two feet in length, with the hot zone being approximately 16 inches in length. The inside of the tube was coated after a few hours with a shiny, mirror-like coating of film and flake which could be recovered from the surface and interior of the tube. The thickness of the film was about 20 micrometers and the shape wa rectangular of dimensions 1 mm to 20 mm. After correcting for the amount recovered from the exit cold trap, the yield of graphite flakes was approximately 75%. The conductivity was 200–300 S/cm. Elemental analysis showed 98.93% carbon and 0.7% hydrogen, suggesting an elemental composition of $C_{10.8}H$. The Raman spectra, shown in FIG. 1, has peaks at 1360 $cm^{-1}$ and 1580 $cm^{-}$(curve A). No change was observed in the Raman spectra after four days at 850° C.

EXAMPLE 1B

Material of Example 1 was heated at 2000° C. for a period of one hour under flowing helium gas at a rate of 20 $cm^3$/min. The resultant product has a conductivity of 1200–1500 S/cm and a lattice spacing $d_{002}$ equal to 3.56Å. The Raman spectra (curve B) of FIG. 1 shows a decrease in the intensity of the disorder peak at 1360 $cm^{-1}$ and a sharpening of the ordered graphitic peak at 1580 $cm^{-1}$ versus the sample treated at 850° C. (curve A).

EXAMPLE 1C

Material as prepared in Example 1 was heat treated at 2600° C. in flowing helium gas for one hour. The product had a conductivity of 12000–15000 S/cm and showed lattice spacing characteristic of graphite. Curve C of FIG. 1 shows that the 1360 $cm^{-1}$ disorder peak in the Raman spectra has disappeared.

EXAMPLE 2

Argon gas at a flow rate of $\approx 10$ cm$^3$min$^{-1}$ was passed through the top of an attached vessel containing pyrazine at $\approx 60°$ C. An independent argon stream at the same flow rate was bubbled through an attached vessel containing chlorine vapor. These two streams merged prior to entering the hot zone, which was maintained at 850° C. in a Thermodyne or Lindberg tube furnace. The pyrolysis tube was made of quartz and was 38 mm in diameter and approximately two feet in length, with the hot zone being approximately 16 inches in length. After a few hours, the inside of the tube was coated with a shiny, mirror-like coating of film and flake which could be recovered from the surface and interior of the tube. The thickness of the film was about 20 micrometers and the shape was rectangular of dimensions 1 mm to 20 mm. The conductivity was 200-300 S/cm. Elemental analysis showed 81. 18% carbon 15.35% nitrogen, and 1.98% hydrogen, suggesting an elemental composition of $C_{6.15}H_{1.8}N$.

EXAMPLE 2B

Material produced in Example 2 was further heated under helium gas for one hour at a flow rate of 20 cm$^3$/min at 2600° C. The product had a conductivity of 9000-10000 S/cm and showed a lattice spacing characteristic of graphite.

EXAMPLE 3

Argon gas at a flow rate of $\approx 10$ cm$^3$min$^{-1}$ was passed through the top of an attached vessel containing naphthalene at $\approx 60°$ C. An independent argon stream at the same flow rate was bubbled through an attached vessel containing chlorine vapor. These two streams merged prior to entering the hot zone, which was maintained at 850° C. in a Thermodyne or Lindberg tube furnace. The pyrolysis tube was made of quartz and was 38 mm in diameter and approximately two feet in length, with the hot zone being approximately 16 inches in length. After a few hours, the inside of the tube was coated with a shiny, mirror-like coating of film and flake was recovered from the surface of the tube. The thickness of the film was about 20 micrometers and the shape was rectangular of dimensions 1 mm to 20 mm. The conductivity was 200-300 S/cm. Elemental analysis showed 98.46% carbon and 0.78% hydrogen, suggesting an elemental composition of $C_{10.5}H$.

EXAMPLE 5

Argon gas at a flow rate of $\approx 10$ cm$^3$min$^{-1}$ was passed through the top of an attached vessel containing biphenyl at $\approx 60°$ C. An independent argon stream at the same flow rate was bubbled through an attached vessel containing chlorine vapor. These two streams merged prior to entering the hot zone, which was maintained at 850° C. in a Thermolyne or Lindberg tube furnace. The pyrolysis tube was made of quartz and was 38 mm in diameter and approximately two feet in length, with the hot zone being approximately 16 inches in length. After a few hours, the inside of the tube was coated with a shiny, mirror-like coating of film and flake which could be recovered from the surface of the tube. The thickness of the film was about 20 micrometers and the shape was rectangular of dimensions 1 mm to 20 mm. The conductivity was 200-300 S/cm. Elemental analysis showed 99.43% carbon and 0.4% hydrogen, suggesting an elemental composition of $C_{20.7}H$.

EXAMPLE 5

Argon gas was passed through a flask containing chlorobenzene heated to 100° C. at a flow rate of 5 cm$^3$/minute. The vapor stream was passed through a quartz tube 38 mm in diameter $\times$ 76 cm in length in a Lindberg furnace with a 40 cm hot zone for 8 hours. After cool-down, carbon flakes were collected by scraping the tube.

EXAMPLE 6

Nitrogen gas was passed through a flask containing benzene heated to 50° C at a flow rate of 12 cm$^3$/minute. The vapor stream was passed through a quartz tube 32 mm in diameter x 46 cm in length in a Thermolyne furnace with a 30 cm hot zone. A nickel plate approximately 1 cm $\times$ 7.5 cm $\times$ 0.1 mm thick was placed in the middle of the hot zone. The benzene vapor was passed over the nickel plate and through the hot zone where graphitic flake and film was formed both on the surface of the nickel plate and on the quartz tube.

The above examples are illustrative of a new process for the rapid high-yield production of conductive graphite in flake and film form. As summarized in Table I, the materials have excellent electrical conductivity, which improves with heat treatment temperature, and at the highest temperatures, show lattice spacings characteristic of graphite.

TABLE I
ROOM TEMPERATURE CONDUCTIVITY AND LATTICE SPACING FOR GRAPHITE MATERIALS OF THIS INVENTION

| Compound of Example | Heat Treatment Temp. (°C.) | Conductivity (Siemens/cm) | Lattice Spacing (Å) | | |
|---|---|---|---|---|---|
| | | | $d_{002}$ | $d_{004}$ | $d_{006}$ |
| 1 | 850 | 200–300 | | | |
| 1B | 2000 | 1200–1500 | 3.56 | — | — |
| 1C | 2600 | 12000–15000 | 3.37 | 1.68 | 1.21 |
| 2 | 850 | 200–300 | | | |
| 2B | 2600 | 9000–10000 | 3.36 | 1.68 | 1.20 |
| 3 | 850 | 200–300 | | | |
| 4 | 900 | $\approx 300$ | | | |
| Graphite | | | 3.36 | 1.68 | 1.12 |

I claim:

1. A process for the production of conductive carbon flakes and films comprising pyrolyzing a reactant gas consisting of:
   a cyclic aromatic hydrocarbon and a non-reactive gas;
   in the presence of an dehydrogenating agent selected from the group consisting of bromine and chlorine, in the absence of both metal and organometallic compound;
   at a temperature of at least about 800° C.;
   wherein said cyclic aromatic hydrocarbon is selected from the group consisting of:
   halogen substituted, alkyl substituted, and unsubstituted unsaturated monocyclic and polycyclic carbon/hydrogen compounds.

2. A process of claim 1 in which the cyclic aromatic hydrocarbon is selected from halogenated benzenes and oligophenylenes.

3. A process of claim 1 in which the cyclic aromatic hydrocarbon is selected from the group consisting of alkyl substituted benzenes and oligophenylenes.

4. A process of claim 1 in which the cyclic aromatic hydrocarbon is selected from the group consisting of benzene, biphenyl, naphthalene, bromobenzene, chlorobenzene, dichlorobenzene, toluene, trichlorobenzene and terphenyl.

5. A process of claim 1 in which the nonreactive gas is selected from helium, argon and nitrogen.

6. A process for the production of conductive carbon flakes and films comprising pyrolizing a reactant gas, consisting of: a halogenated cyclic aromatic hydrocarbon and nonreactive gas at a temperature of at least 800° C., in the absence of both metal an organometallic compound.

7. A process of claim 6 in which the nonreactive gas is selected from helium, argon and nitrogen.

8. A process of claim 6 in which the halogenated cyclic aromatic hydrocarbon is selected from chlorobenzene, bromobenzene, dichlorobenzene or trichlorobenzene.

9. A process of claim 1 comprising further heating the flake or film in an inert atmosphere at a temperature of about 1200 to about 3000° C to further increase the crystalline order and electrical conductivity.

10. A process of claim 6 comprising further heating the flake or film in an inert atmosphere at a temperature of about 1200 to about 3000° C. to further increase the crystalline order and electrical conductivity.

11. A process of claim 1 in which the temperature is from about 800° C. to about 900° C.

12. A process of claim 6 in which the temperature is from about 800° C. to about 900' C.

13. A process for the production of conductive carbon flakes and films comprising pyrolyzing a reactive gas consisting of: pyrazine and non-reactive gas; in the presence of a dehydrogenating agent selected from the group consisting of bromine and chlorine, in the absence of both metal and organometallic compound, at a temperature of at least 800° C.

* * * * *